United States Patent [19]

Legoria

[11] 4,186,497
[45] Feb. 5, 1980

[54] ASSEMBLY FOR FACILITATING TEACHING READING

[76] Inventor: Bernadette C. Legoria, 606 Farris Dr., Hammond, La. 70401

[21] Appl. No.: 877,008

[22] Filed: Feb. 13, 1978

[51] Int. Cl.² .............................................. G09B 1/10
[52] U.S. Cl. ...................................... 35/35 R; 46/154
[58] Field of Search ................ 35/1, 8 R, 31 G, 35 R, 35/35 E, 35 J, 60, 69, 70, 71, 73; 46/115, 154

[56] References Cited

U.S. PATENT DOCUMENTS

| | | | |
|---|---|---|---|
| 339,741 | 4/1886 | Clough | 35/60 |
| 421,512 | 2/1890 | Potter | 35/60 |
| 1,377,261 | 5/1921 | McLain et al. | 35/71 |
| 1,406,592 | 2/1922 | Watkins | 35/60 |
| 1,563,582 | 12/1925 | McDade | 35/35 R |
| 2,265,334 | 12/1941 | Armbruster | 35/35 J X |
| 3,365,198 | 1/1968 | Hay | 35/71 X |
| 3,478,446 | 11/1969 | McCutcheon | 35/73 |
| 3,918,180 | 11/1975 | Chamberlin | 35/35 E |

*Primary Examiner*—William H. Grieb
*Attorney, Agent, or Firm*—Roy, Kiesel, Patterson & Abadie

[57] ABSTRACT

An assembly of teaching aids combined for facilitating teaching of reading comprising a learning station, doll models shaped like alphabet letters wherein each is attached to poles and at least three other character doll models.

1 Claim, 4 Drawing Figures

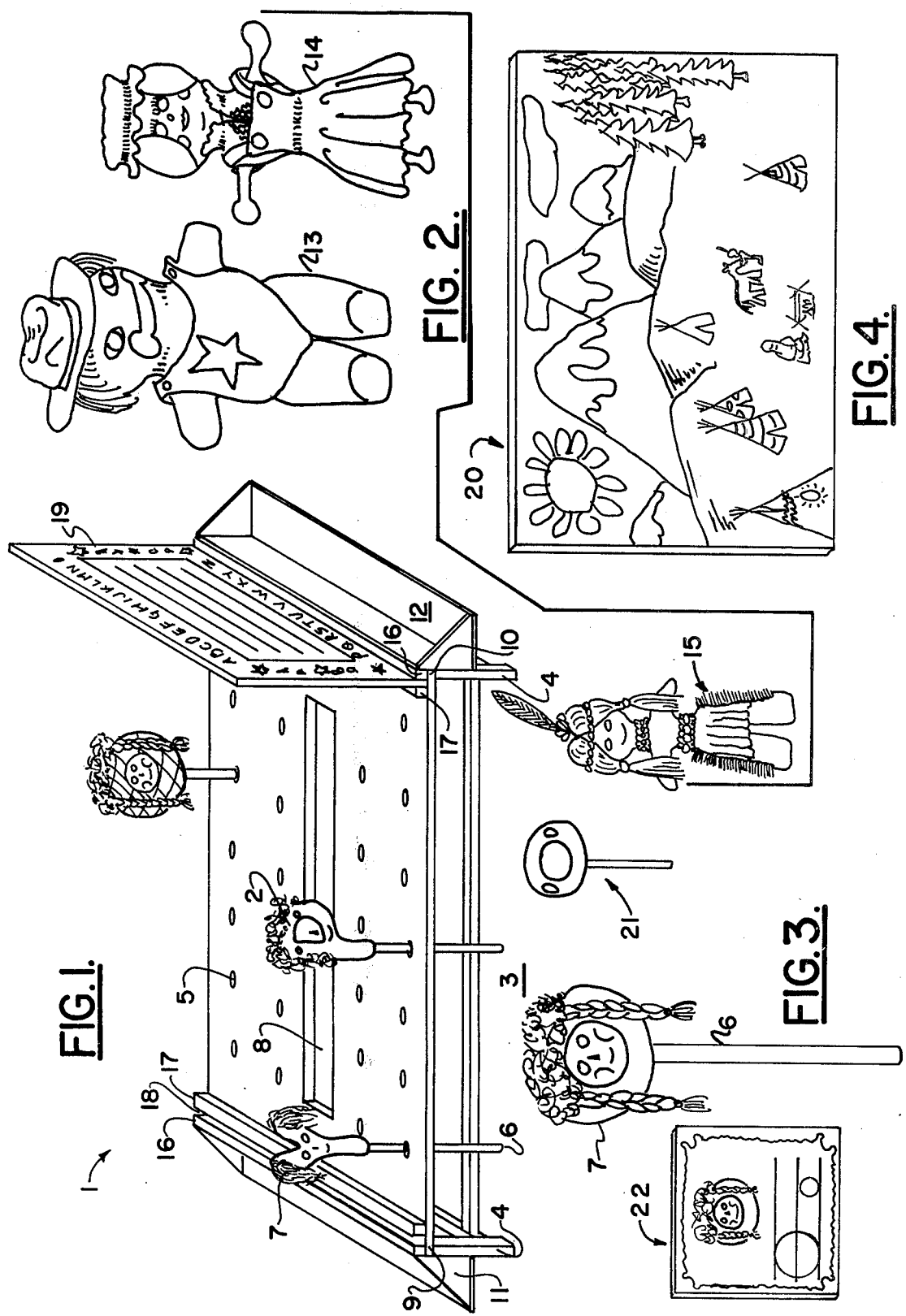

ASSEMBLY FOR FACILITATING TEACHING READING

BACKGROUND OF THE INVENTION

1. Field of the Invention

This invention relates in general to education and, more particularly, to an assembly of teaching aids for facilitating teaching of reading.

2. Prior Art

Reading has long been one of the basic skills which educators have attempted to find methods and associated aids to increase their effectiveness in teaching reading to persons, particularly pre-school and grade school children. The present thought in education today is to provide a reading program designed toward individualization of instruction. The difficulty in such an approach is not only to design such a program, but to design one which develops all reading skills and which will be of interest to children of all ethnic backgrounds. A second area of difficulty is developing teaching aids which provide the teacher flexibility in easily modifying specific teaching programs for particular needs that might arise with certain students.

SUMMARY OF THE INVENTION

Therefore, it is one object of this invention to provide an assembly of teaching aids to facilitate teaching of reading.

Another object of this invention is to provide an assembly of reading teaching aids that can be used in reading programs designed toward individualization of instruction.

Still another object of this invention is to provide an assembly of teaching aids which can be used in a reading program that can be easily modified.

A further object of this invention is to provide an assembly of teaching aids utilized in a reading program designed for students who may have different ethic backgrounds.

Other objects and advantages of this invention will become apparent from the ensuing descriptions of the invention.

Accordingly, an assembly of teaching aids utilized with reading and reading readiness programs is provided comprising a learning station, doll models shaped like alphabet letters and three other character doll models.

BRIEF DESCRIPTION OF THE DRAWINGS

FIG. 1 is a perspective view of one embodiment of the learning station with various alphabet doll models in place.

FIG. 2 is a perspective view of three embodiments of the character doll models.

FIG. 3 is a perspective view of a comparative preferred embodiment illustrating an alphabet doll model, a hand puppet alphabet model and an alphabet letter form.

FIG. 4 is an alternate embodiment of the learning station illustrating use of a story screen.

PREFERRED EMBODIMENTS OF THE INVENTION

Referring to FIG. 1, the learning station, denoted generally by the numeral 1, serves not only as a storage area for all of the teaching aids of this invention but also serves as the focal point or stage about which the teacher utilizes the other teaching aids. While learning station 1 can have many configurations, a preferred arrangement includes a flat rectangular panel 2 supported above the floor 3 by legs 4. In a preferred embodiment, panel 2 is provided with twenty-six openings 5 through which poles 6 attached to alphabet doll models 7 can pass. In another preferred embodiment, panel 2 is provided with an elongated slit 8 running down the center area of panel 2. On opposite ends 9 and 10 of panel 2 are attached bench assemblies 11 and 12, respectively, in which can sit character doll models 13, 14 and 15 (see FIG. 2). Also at each end 9 and 10 are story or work screen holding members, preferably pairs of wooden strips 16, 17 separated from one another by gap 18 as shown. Work screen 19 or story screen 20 (see FIG. 4) are rectangular panes that fit in gaps 18 perpendicularly to panel 2 and are held in fixed positions by strips 16, 17 as shown. In a preferred embodiment, work screen 19 and story screen 20 can be combined into one panel by printing the work format shown in FIG. 1 on one side and the story format shown in FIG. 4 on the opposite side. In a more preferred embodiment, there will be two separate screens with all four sides being utilized with story drawings, work formats, etc.

Each of the twenty-six alphabet doll models comprises a pole 6 attached to a stuffed body 7 shaped like one of the alphabet and designed to resemble a head. More preferably, each pole 6 is of a length (e.g., about 3′) to allow the children being taught to play with it like a stick horse. In another preferred embodiment, the alphabet doll models are color coded to the initial sounds of color words; e.g., the letter "R" is red, the letter "G" is green, etc. It is further preferred that all vowel letters have a common pattern such as checkered and that all consonant letters have a common pattern such as solid.

In addition to the alphabet doll models, it is preferred that hand puppet models 21 (see FIG. 3) also be employed. In doing so, it is preferred that they be color and pattern coded to match their corresponding alphabet doll models. Still further preferred is the use of laminated cards 22 having printed thereon the upper and lower case of a particular letter as well as a drawing of the corresponding alphabet doll model head 7.

Finally, the use of three other doll models 13, 14 and 15 facilitate the use of stories, etc. in teaching. It is preferred that each of the models represent a different personage and, more particularly, a different ethnic background (e.g., sheriff model 13 is black, lady model 14 is white and child model 15 is red). This also allows the teacher to assign different personalities to each of the models.

There are, of course, many alternate embodiments which are included within the scope of this invention as defined by the following Claims.

What I claim is:

1. An assembly of teaching aids utilized in reading instructions comprising in combination:
    (a) a learning station;
    (b) twenty-six (26) alphabet doll models having upper portions shaped like different alphabet letters, said alphabet doll models shaped like vowels are constructed having a common design pattern and wherein said alphabet doll models shaped like consonants are constructed having a different common design pattern, said alphabet doll models are color coded to the initial sounds of color words;
    (c) twenty-six (26) hand puppet models, said hand puppet models are color and pattern coded to match their corresponding alphabet doll models; and
    (d) at least three (3) different character doll models.

* * * * *